Patented May 26, 1953

2,640,072

UNITED STATES PATENT OFFICE 2,640,072

VALERIC ACID DERIVATIVES

Karl Klager, Monrovia, Calif.

No Drawing. Application December 21, 1951,
Serial No. 262,880

6 Claims. (Cl. 260—484)

(Granted under Title 35, U. S. Code (1952),
sec. 266)

The invention described herein may be manufactured and used by or for the Government of the United Sttaes of America for governmental purposes without the payment of any royalties thereon and therefor.

This invention relates to new polynitro compounds and to a process for the preparation thereof. Specifically, these new compounds may be represented by the following structural formula:

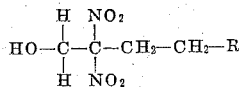

in which R represents a member of the group including carboxyl and carboxyl derivatives. Compounds in which R represents a carboxyl derivative group, such as an ethyl ester, for example, may readily be converted to 5-hydroxy-4,4-dinitrovaleric acid. However, the acid form lactonizes spontaneously in many cases to form 4,4-dinitrovalerolactone. The nature of the carbonyl derivative group is immaterial since that group is not involved in the formation of the desired compounds. These new compounds may be reacted with sodium methylate to split out formaldehyde and produce the sodium salt of various esters of 4,4-dinitrobutyrate.

As examples of compounds coming within the scope of the above mentioned formula there may be mentioned the following: methyl ester of 5-hydroxy-4,4-dinitrovaleric acid, ethyl 5-hydroxy-4,4 - dinitropentanoate, 5 - hydroxy-4,4-dinitrovaleric acid, 4,4-dinitrovalerolactone, sodium salt of methyl-4,4-dinitrobutyrate, and the like.

An object of the invention is to provide new nitro compounds. Another object of the invention is to provide a process for the production of new derivatives of valeric acid. A further object is to provide a process for reacting potassium dinitroethanol derivatives of acrylic acid such as, for example, methyl acrylate, ethyl acrylate, acrylonitrile, and acrylamide. Further objects will appear hereinafter.

A new type of polynitro compound is produced by the reaction of equimolar quantities of potassium dinitroethanol and derivatives of acrylic acid as shown in the following equation:

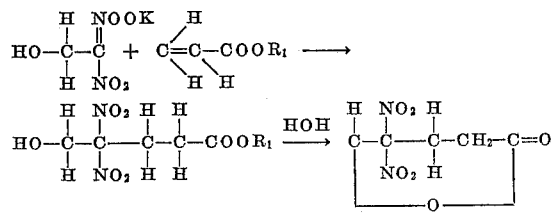

in which $R_1$ represents, for example, an alkyl group. A pH of 6 is maintained during the condensation reactions by neutralizing the KOH formed with acetic acid. The reactions are carried out at room temperature, and yellow oils, scarcely soluble in water, are obtained. By treatment of the oils with 1:1 HCL, the esters are hydrolyzed, and the resulting acid then lactonizes spontaneously to form 4,4-dinitrovalerolactone. The lactone is a light yellow oil boiling at 160° C. under 2 mm. pressure. The lactone crystallizes; it is very soluble in most organic solvents and also in water and is insoluble in petroleum ether and hexane.

The examples which follow are illustrative of the various types of valeric acid derivatives that come within the scope of the invention. They are likewise illustrative of the procedures whereby these new chemical compounds may be synthesized.

*Example I.*—A 34.8 gm. sample of potassium dinitroethanol and 100 ml. of water were placed in a three-necked flask fitted with stirrer, thermometer, and condenser. Then 17 gm. of methyl acrylate was dropped into the mixture within five minutes. While the reaction proceeded, a mixture of 12 gm. acetic acid and 12 gm. water was added over a period of one hour with good agitation. The temperature did not exceed 30° C. during this time. After three hours' stirring, nearly all of the potassium salt disappeared. The brown solution which formed was stirred for an additional three hours and allowed to stand overnight. Two layers were formed. After extracting the mixture with ether and washing with saturated sodium chloride solution, sodium bicarbonate, and again with saturated sodium chloride solution, the ether was removed. The yield was 8.93 gm. of methyl 4,4-dinitro-5-hydroxyvalerate, $n_D^{25}=1.4738$.

*Example II.*—A round bottom flask provided with a stirrer, thermometer and dropping funnel was charged with 15.8 gm. sodium salt of 2,2-dinitroethanol and 100 ml. water. A solution of 10 gm. ethyl acrylate and 5.4 gm. glacial acetic acid was added at once while stirring rapidly. The temperature was kept below 30° C. After 8 hours' stirring, the mixture was allowed to stand overnight. Two phases were formed. Upon addition of methylene chloride the lower phase contained the ethyl 5-hydroxy-4,4-dinitrovalerate, which, after drying over sodium sulfate, was freed from solvent in vacuum. The yield was 8.2 gm. of a slightly yellow colored oil, which could not be distilled due to decomposition $n_D^{25}=1.4666$.

*Example III.*—In the above described apparatus, 15.8 gm. sodium salt of 2,2-dinitroethanol was dissolved in 100 ml. water; 50 ml. methanol was added and while stirring rapidly a mixture of 12.8 gm. butyl acrylate and 5.4 gm. glacial acetic acid was added at once. The temperature did not exceed 30° C. After continued stirring at 25° C. for 20 hours, two phases were formed. The mixture was extracted with methylene chloride and the methylene chloride solution washed with saturated sodium chloride solution. The methylene chloride solution was dried and the solvent completely evaporated. The residue was butyl 5-hydroxy-4,4-dinitrovalerate in the form of a slightly yellow oil which could not be purified by distillation. Yield 6 gm. $n_D^{25}=1.4625$.

*Example IV.*—A mixture of 8.93 gm. of methyl 4,4-dinitro-5-hydroxyvalerate and 45 ml. dilute HCL (1:1) was heated for 30 minutes on a steambath. The oil which was insoluble disappeared slowly. The solution was then extracted with ether and the ether solution washed neutral with saturated sodium chloride and sodium bicarbonate solution. After removing the ether, the residue distilled in an air bath at 150° to 160° C. under a pressure of 2 mm. mercury. The nearly colorless oil obtained was 4,4-dinitrovalerolactone which, after crystallization from ether, melted at 78°–79° C. The same procedure may be used to form the lactone from other esters.

*Example V.*—57.2 gm. methyl 5-hydroxy-4,4-dinitrovalerate was dissolved in 150 ml. methanol and a mixture of 16 gm. sodium methylate in 80 ml. methanol was added dropwise at a temperature of 0° to 10° C. The addition was conducted within 30 minutes. A yellow precipitate formed, which was then collected on a filter and washed thoroughly with ether. The compound is the sodium salt of methyl-4,4-dinitrobutyrate.

*Example VI.*—A flask provided with thermometer, stirrer and dropping funnel was charged with 9.5 gm. ethyl 5-hydroxy-4,4-dinitrovalerate and 35 ml. methanol. The mixture was cooled to 0° C. and 30 ml. 10% sodium methylate in methanol was added slowly. From the brown solution formed, yellow crystals precipitated which were collected on a filter and washed with a mixture of methanol and ether. Yield 9.2 gm., M. P. 166° C. dec. of sodium ethyl-4,4-dinitrobutyrate

*Example VII.*—In the apparatus described above the amount of 8 gm. butyl 5-hydroxy-4,4-dinitrovalerate was dissolved in 12 ml. methanol. The mixture was cooled to 0° C. and 20 ml. 10% sodium methylate in methanol was added slowly. A bright yellow precipitate was formed almost immediately. By warming at room temperature, the salt is soluble. After cooling to −15° C. the crystalline salt was filtered off and washed with a mixture of methanol and ether. The yield was 6.9 gm., M. P. 190° C. dec. of sodium butyl-4,4-dinitrobutyrate.

The nitrated aliphatic compounds resulting from the above described process are valuable explosive ingredients since they are uniform and relatively stable. The compounds of this invention also exhibit utility as intermediates from which a variety of nitrated products may be prepared.

Obviously many modifications and variations of the present invention are possible in the light of the above teachings. It is therefore to be understood that within the scope of the appended claims the invention may be practiced otherwise than as specifically described.

What is claimed is:

1. Compounds having the formula:

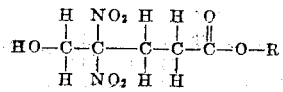

in which R is a member of the group consisting of lower unsubstituted alkyl radicals.

2. Methyl 5-hydroxy-4,4-dinitrovalerate.
3. Ethyl 5-hydroxy-4,4-dinitrovalerate.
4. Butyl 5-hydroxy-4,4-dinitrovalerate.
5. A process for the preparation of valeric acid derivatives of the class described which comprises adding a lower unsubstituted alkyl ester of acrylic acid to a suspension of potassium dinitroethanol in water, adding acetic acid sufficient to maintain the pH of the reaction mixture at a value of about 6.0, and allowing the mixture to stand until the reaction between said potassium dinitroethanol and said ester is substantially complete.
6. A process for the preparation of methyl 5-hydroxy-4,4-dinitrovalerate which comprises adding methyl acrylate to a suspension of potassium dinitroethanol in water, adding acetic acid sufficient to maintain the pH of the reaction mixture at a value of about 6.0, and allowing the mixture to stand until the reaction between said potassium dinitroethanol and said ester is substantially complete.

KARL KLAGER.

No references cited.